US012680984B2

(12) United States Patent (10) Patent No.: US 12,680,984 B2
Tomono et al. (45) Date of Patent: Jul. 14, 2026

(54) ANALYSIS DEVICE

(71) Applicant: SHIMADZU CORPORATION, Kyoto (JP)

(72) Inventors: Taichi Tomono, Kyoto (JP); Hiroshi Mizushima, Kyoto (JP); Kiyokazu Nakatsuka, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 337 days.

(21) Appl. No.: 18/689,263

(22) PCT Filed: Jun. 2, 2022

(86) PCT No.: PCT/JP2022/022521
§ 371 (c)(1),
(2) Date: Mar. 5, 2024

(87) PCT Pub. No.: WO2023/037674
PCT Pub. Date: Mar. 16, 2023

(65) Prior Publication Data
US 2024/0377366 A1 Nov. 14, 2024

(30) Foreign Application Priority Data
Sep. 10, 2021 (JP) ................................. 2021-148127

(51) Int. Cl.
*G01N 30/06* (2006.01)

(52) U.S. Cl.
CPC .................................... *G01N 30/06* (2013.01)

(58) Field of Classification Search
CPC ........ G01N 30/06; G01N 30/62; G01N 30/16; G01N 30/24; G01N 35/00; G01N 35/04
See application file for complete search history.

(56) References Cited

U.S. PATENT DOCUMENTS

2018/0246132 A1 8/2018 Mori et al.
2020/0256768 A1* 8/2020 Cuypers ................. G01N 21/67

FOREIGN PATENT DOCUMENTS

CN 212060277 U * 12/2020
CN 113341001 A * 9/2021 ............. G01N 30/36
(Continued)

OTHER PUBLICATIONS

American National Standards Institute, ed., "for Microplates—Bottom Outside Flange Dimensions", [online], Oct. 13, 2011, American National Standards Institute, [searched on Jul. 29, 2021], Internet <URL:https://www.slas.org/SLAS/assets/File/public/standards/ANSI_SLAS_3-2004_BottomOutsideFlangeDimensions.pdf. Cited in specificaiton.

(Continued)

*Primary Examiner* — Francis C Gray
(74) *Attorney, Agent, or Firm* — Renner, Otto, Boisselle & Sklar, LLP

(57) ABSTRACT

An analysis device includes: a sample storage having an opening/closing part and incorporating an internal mounting table to receive a sample accommodation unit; and a sample inserting unit to insert the sample accommodation unit into the sample storage, wherein the sample accommodation unit having a plane direction, includes a flange at an end portion in the plane direction, and the sample inserting unit includes: an external mounting table outside the sample storage; a movable table on the surface of the external mounting table so as to be movable between a first position and a second position, the first position and second position being farther and closer with reference to the internal mounting table, the movable table including an engaging section to engage with the flange; and a driving unit to move the movable table to change an engagement state between the flange and the engaging section.

8 Claims, 6 Drawing Sheets

(56)         References Cited

FOREIGN PATENT DOCUMENTS

JP          2004528531  A  *  9/2004    ....... G01N 27/44743
WO        2017/038546  A1      3/2017
WO      WO-2021021700  A1 *  2/2021    ............. G01N 30/24

OTHER PUBLICATIONS

International Search Report for corresponding International Application No. PCT/JP2022/022521 mailed Aug. 9, 2022.
Written Opinion for corresponding International Application No. PCT/JP2022/022521 mailed Aug. 9, 2022.

* cited by examiner

MOVABLE TABLE LINEAR MOVING MECHANISM

MOVABLE TABLE TILTING MECHANISM

TO 30

ANALYSIS DEVICE

TECHNICAL FIELD

The present invention relates to an analysis device such as a liquid chromatograph or a gas chromatograph.

BACKGROUND ART

In an analysis device such as a liquid chromatograph or a gas chromatograph, a plurality of samples are stored in a sample accommodation unit, the sample accommodation unit is inserted into an autosampler, and processing of sequentially executing analysis on the plurality of samples is performed. The sample accommodation units include a microplate having a plurality of wells, a vial rack for holding a plurality of vials each storing individual samples, and the like.

The analysis device described in Patent Literature 1 includes a reagent mounting unit which installs a plurality of bottles of reagents to be dispensed into a sample on a reagent disk. In the reagent mounting unit, the reagent disk is kept cool, and a sample loading/unloading port for loading and unloading a sample from the outside, and a cover for opening and closing the sample loading/unloading port are provided. When charging a reagent onto the reagent disk, the cover is opened, an operator mounts a plurality of reagent bottles one by one on a reagent mounting portion in the reagent disk, and the cover is closed. Similarly, in a case where a sample is taken out from the reagent disk, the cover is opened, the operator takes up the reagent bottles one by one from the reagent mounting unit to unload the reagent bottles from the reagent disk, and the cover is closed.

CITATION LIST

Patent Literature

Patent Literature 1: WO 2017/038546 A

Non Patent Literature

Non Patent Literature 1: American National Standards Institute, ed., "for Microplates-Bottom Outside Flange Dimensions", [online], Oct. 13, 2011, American National Standards Institute, [searched on Jul. 29, 2021], Internet

SUMMARY OF INVENTION

Technical Problem

In an analysis device described in Patent Literature 1, a reagent (sample) is cooled in a reagent disk (sample cooling storage) in order to prevent volatilization of a solvent or decomposition of a solute of the reagent (sample). On the other hand, depending on the sample to be analyzed, it is necessary to heat the sample in a sample heating storage instead of the sample cooling storage in order to prevent precipitation of the solute. Hereinafter, the sample cooling storage and the sample heating storage are collectively referred to as sample temperature retaining storage. In any case, since the temperature inside the sample temperature retaining storage is different from that outside, it is necessary to prevent the outside air from flowing into the sample temperature retaining storage as much as possible when the sample is carried into or out of the sample temperature retaining storage. However, when the analysis device described in Patent Literature 1 has a structure in which the operator loads the reagent (sample) into and out of the sample temperature retaining storage one by one, the cover is opened for a long time when an unskilled operator takes time to perform an operation, which greatly changes the temperature in the sample temperature retaining storage. This may cause volatilization of the solvent, decomposition of the solute (in the case of the cooling storage), or precipitation of the solute (in the case of the heating storage) before the inside of the sample temperature retaining storage returns to have an original temperature. Furthermore, when, in the case of the cooling storage, outside air containing moisture flows into the cooling storage, dew condensation may occur in the storage.

An object of the present invention is to provide an analysis device including a sample inserting unit capable of suppressing a change in temperature inside a sample storage as much as possible when a sample is inserted into and out of a predetermined sample storage including a sample temperature retaining storage.

Solution to Problem

An analysis device according to the present invention made to solve the above problems includes:

a sample storage including an opening/closing part and an internal mounting table, the internal mounting table configured to receive a sample accommodation unit via the opening/closing part; and a sample inserting unit configured to insert the sample accommodation unit into the sample storage, wherein the sample accommodation unit, which has a plane direction, includes a flange provided at an end portion thereof in the plane direction, and the sample inserting unit includes:

an external mounting table provided outside the sample storage and having a surface;

a movable table provided on the surface of the external mounting table so as to be movable between a first position and a second position, the first position and second position being farther and closer with reference to the internal mounting table, the movable table including an engaging section configured to engage with the flange of the sample accommodation unit; and a driving unit configured to move the movable table to change an engagement state between the flange of the sample accommodation unit and the engaging section of the movable table.

Advantageous Effects of Invention

With the sample inserting device according to the present invention, the only things that should be performed by the operator are to store a sample in a sample accommodation unit in advance, and when the sample accommodation unit is to be inserted into a sample storage, to mount the sample accommodation unit on a movable table at a first position and to engage a flange of the sample accommodation unit with an engaging section of the movable table. Then, the sample inserting device automatically opens an opening/closing part, moves a movable table to a second position by a moving unit, closes the opening/closing part, and disengages the flange and the engaging section by a driving unit, thus the sample accommodation unit is inserted into the sample storage. Similarly, when the sample accommodation unit is taken out from the sample storage, the sample inserting device automatically sets the flange and the engaging section to be in an engaged state by the driving unit, opens the opening/closing part, and then moves the movable table from the second position to the first position by the moving unit to close the opening/closing part. The operator only needs to pick up, from the movable table, the sample accommodation unit mounted on the movable table moved to the first position and having the flange engaged with the engaging section. As described above, since the operation of inserting and taking out the sample into and from the sample storage can be easily performed collectively by the operation of inserting and taking out the sample accommodation unit, the time during which the opening/closing part of the sample storage is open can be minimized, and the temperature change or condensation in the sample storage can be minimized.

Note that the operation of mounting the sample accommodation unit on the movable table or taking out the sample accommodation unit from the movable table may be performed by a robot instead of the operator. Furthermore, by automatically performing, in synchronization with it, the opening/closing operation of the opening/closing part and the position changing operation of the driving unit, the burden on the operator is reduced, and the time during which the opening/closing part of the sample storage is open can be further shortened.

BRIEF DESCRIPTION OF DRAWINGS

FIG. 2 is a schematic configuration diagram illustrating an embodiment of a chromatograph having a sample inserting device according to the present invention.

DESCRIPTION OF EMBODIMENTS

Hereinafter, an embodiment of a chromatograph which is an analysis device according to the present invention will be described with reference to the drawings.

Figure 1A:
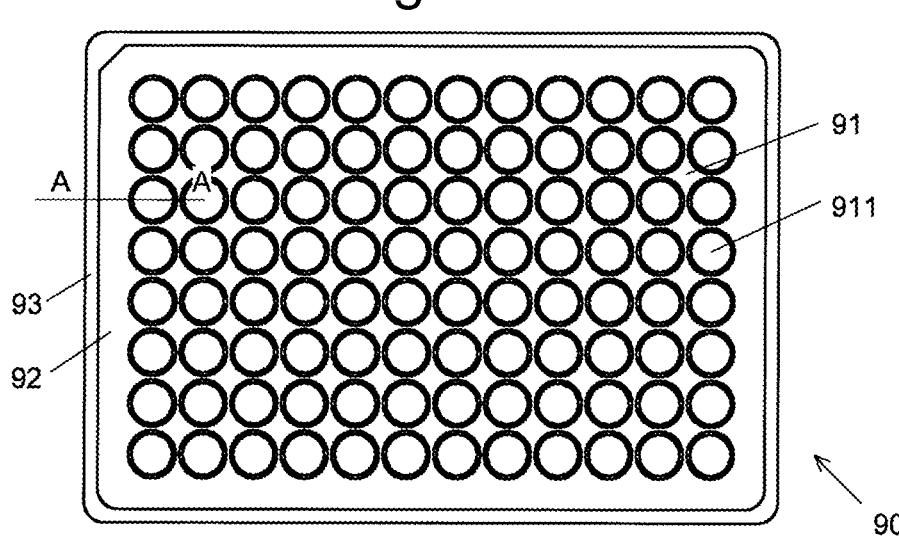
FIG. 1A is a top view illustrating an example of a microplate (sample accommodation unit) to be inserted into an analysis device by a sample inserting device according to the present invention.
Figure 1B:
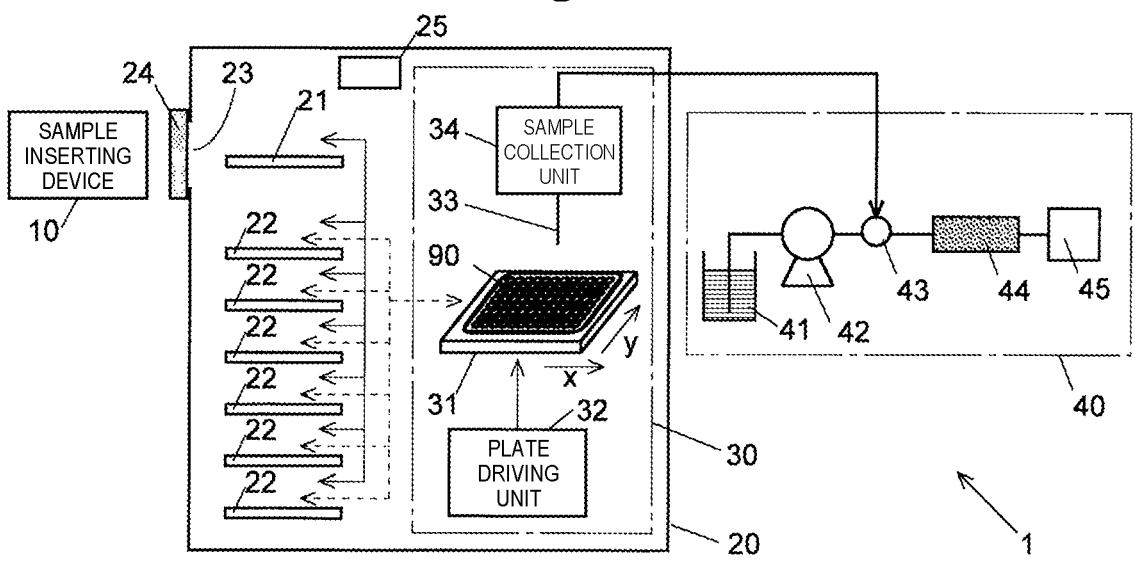
FIG. 1B is a cross-sectional view taken along line A-A of the microplate illustrated in FIG. 1A.

First, an example of a sample accommodation unit to be inserted into a sample storage in an analysis device of the present embodiment will be described with reference to FIGS. 1A and 1B. A sample accommodation unit 90 is a microplate conforming to the ANSI/SBS standard established by the Society for Biomolecular Screening (SBS) in the United States and approved by the American National Standards Institute (ANSI). The "ANSI/SBS 3-2004" of the ANSI/SBS standards defines provision of a flange protruding from an outer peripheral portion of a microplate and having a tip extending downward (Non Patent Literature 1). The sample accommodation unit 90 includes a main body portion 91 in which a plurality of wells 911 (the number is 96 in an example of FIG. 1A, but is not limited to it) in which a sample is accommodated is provided, and a flange 93 provided at an end portion in a plane direction of the main body portion 91. Note that, in the example shown here, the flange 93 is provided over the entire circumference of the main body portion 91, but may be provided only on a part of the outer peripheral portion of the main body portion 91. Furthermore, although the example of the microplate has been described here, a sample accommodation unit such as a vial rack, other than the microplate provided, with a similar flange in compliance with the ANSI/SBS standard is widely used, and such a sample accommodation unit such as a vial rack can be handled in the analysis device of the present embodiment.

FIG. 2 illustrates an outline of a configuration of a chromatograph which is an analysis device of the present embodiment. A chromatograph 1 includes a sample inserting device (sample inserting unit) 10, a sample storage 20, an autosampler 30, and a liquid chromatograph (LC) unit 40. Hereinafter, first, the configuration of each unit other than the sample inserting device 10 will be described, and then the configuration of the sample inserting device 10 will be described in detail.

In the sample storage 20, an internal mounting table 21 and a sample storage shelf 22 are disposed, and an opening (sample loading/unloading port) 23 is provided in a part of a side wall. In the present embodiment, the autosampler 30 is also disposed in the sample storage 20.

As will be described later, the internal mounting table 21 is a table on which the sample accommodation unit 90 is mounted when the sample accommodation unit 90 is inserted into the sample storage 20 by the sample inserting device 10 and immediately before the sample accommodation unit 90 is taken out from the sample storage 20. The upper surface of the internal mounting table 21 is located at the same height as the sample loading/unloading port 23. The sample storage shelf 22 is a shelf configured to store the sample accommodation unit 90 until the sample accommodation unit 90 loaded in the sample storage 20 is transferred to the autosampler 30 and until the sample in the sample accommodation unit 90 is taken out from the sample storage 20 after being collected by the autosampler 30. In the present embodiment, the sample storage shelf 22 is provided below the internal mounting table 21, but the position of the internal mounting table 21 is not limited to this example as long as it is in the sample storage 20. The sample accommodation unit 90 is moved by a manipulator (not illustrated) between the internal mounting table 21 and the sample storage shelf 22 and between the sample storage shelf 22 and the autosampler 30.

An opening/closing door (opening/closing part) 24 is a door configured to close the sample loading/unloading port 23 from the outside of the sample storage 20, and is configured to open the sample loading/unloading port 23 by lowering from a height of the sample loading/unloading port 23 to a predetermined position (open position), and is configured to close the sample loading/unloading port 23 by raising from a state in which the sample loading/unloading port 23 is opened to a predetermined position (closed position). As described later, the opening/closing door 24 moves up and down by an operation of a movable table tilting/opening and closing door lifting motor 1521.

The sample storage 20 is further provided with a temperature retaining device 25 configured to maintain the inside of the container at a temperature within a predetermined temperature range by heating and/or cooling the inside of the storage.

The autosampler 30 includes a sample plate 31 on which the sample accommodation unit 90 is mounted, a plate driving unit 32 configured to move the sample plate 31 in the X-axis direction and the Y-axis direction orthogonal to each other, and a sample collection unit 34 including a needle 33, a lifting mechanism of the needle 33, and the like. The plate driving unit 32 is configured to sequentially move a plurality of wells 911 (or vials or the like. The same applies hereinafter.) of the sample accommodation unit 90 mounted on the sample plate 31 to immediately below the needle 33, and the needle 33 descends to the well 911 to suck and collect a liquid sample every time each of wells 911 reaches immediately below it. The collected liquid sample is supplied to an injector 43 of the LC unit 40 described below.

The LC unit 40 includes a mobile phase container 41 in which a mobile phase is stored, a pump 42 configured to suck the mobile phase in the mobile phase container 41 and supplies the mobile phase at a substantially constant flow rate, the injector 43 configured to inject a sample solution into the mobile phase, a column 44 configured to temporally separate various components contained in the sample solution injected into the mobile phase, and a detector 45 configured to sequentially detect the various components separated by the column 44. As the detector 45, a mass spectrometer, a photodiode array (PDA) detector, an ultraviolet-visible spectrophotometric detector, and the like can be used.

Note that the autosampler 30 and the LC unit 40 have the same configurations as the autosampler and the LC unit included in the conventional liquid chromatograph. A configuration different from the above configuration can be applied to the autosampler 30 and the LC unit 40. For example, a mechanism of performing processing of adding a solvent, a reagent for causing a chemical reaction in a sample, and the like to the sample may be added to the autosampler 30. Furthermore, a gas chromatograph may be used instead of the liquid chromatograph (LC unit 40), and the gas sample enclosed in the vial of the sample accommodation unit may be collected by the autosampler 30.

Hereinafter, the configuration of the sample inserting device 10 will be described in detail with reference to FIGS. 3A to 6C. The sample inserting device 10 is provided outside the sample storage 20, and includes an external mounting table 11, a movable table 12, an engaging section 13, an auxiliary mounting table 14, and a movable table moving mechanism (driving unit) 15.

Figure 3A:
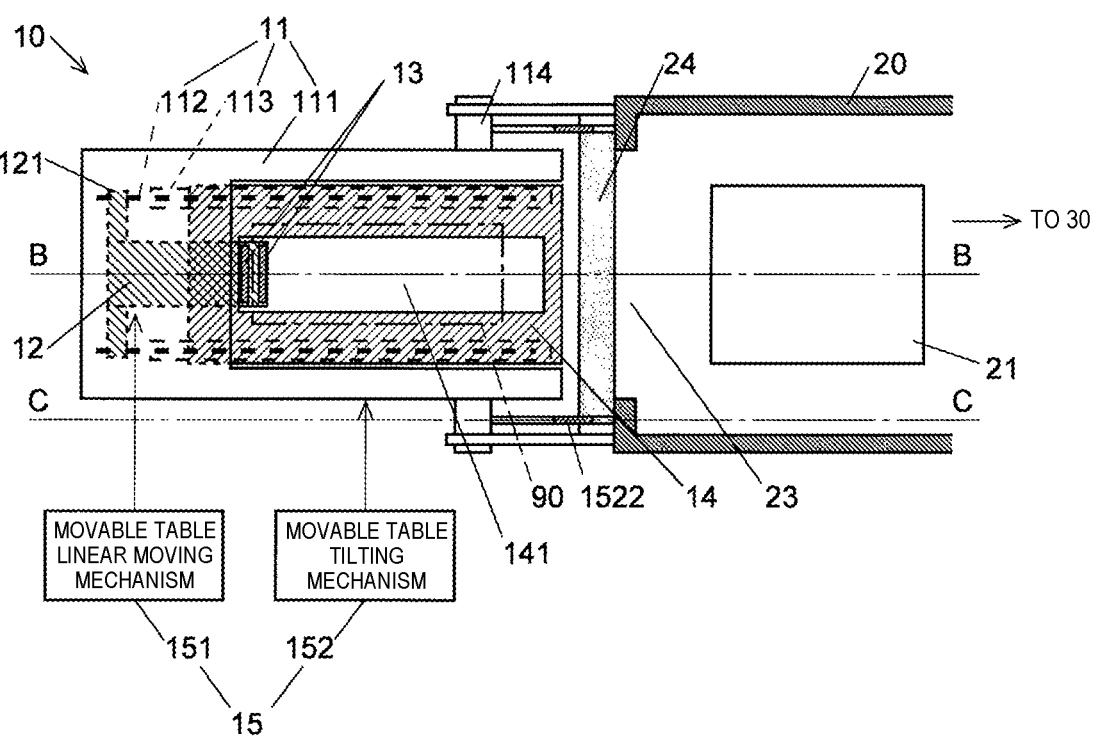
FIG. 3A is a top view illustrating a configuration of an embodiment of the sample inserting device according to the present invention and showing a state when a movable table is located at a first position.

The external mounting table 11 includes a rectangular parallelepiped box-shaped main body 111, a movable table guide rail 112, and an auxiliary mounting table support rail 113 (FIG. 3A). The main body 111 is provided such that one of short sides of the rectangle of the upper surface faces the sample loading/unloading port 23. Hereinafter, in the description of each component of the sample inserting device 10, front, rear, left, and right are defined with the end portion on the sample loading/unloading port 23 side of the external mounting table 11 as the front side. A part of the main body 111 including the side surface on the front side and the end portion of the upper surface close to the sample loading/unloading port 23 is an opening, and the movable table 12 and the auxiliary mounting table 14 are disposed in the vicinity of the opening on the upper surface side. The movable table guide rail 112 and the auxiliary mounting table support rail 113 extend in the front-rear direction, and are provided in the main body 111 in parallel with two each in the lateral direction. The movable table guide rail 112 is disposed below the auxiliary mounting table support rail 113.

The movable table 12 includes a rectangular plate-like member (FIGS. 4A and 4B), and is disposed with one short side of the rectangle facing the front side. A rear end of the movable table 12 protrudes from the rectangle to both left and right sides, and a grip part 121 provided at a tip of the protruding portion grips the movable table guide rail 112 (FIG. 3A). Note that illustration of the movable table guide rail 112 and the grip part 121 is omitted in the drawings other than FIG. 3A in order to make the drawing easy to see.

Figure 4A:
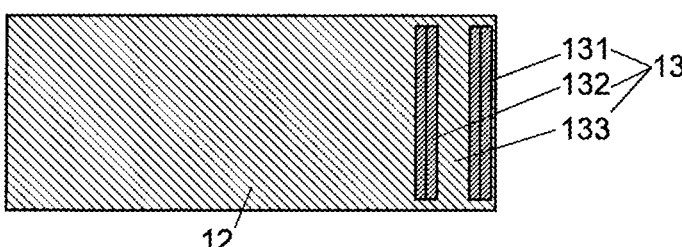
FIG. 4A is an enlarged top view of the movable table and an engaging section included in the sample inserting device of the present embodiment.
Figure 4B:
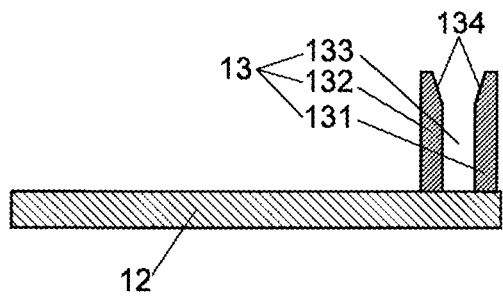
FIG. 4B is an enlarged cross-sectional view taken along line B-B of the movable table and the engaging section.
Figure 4C:
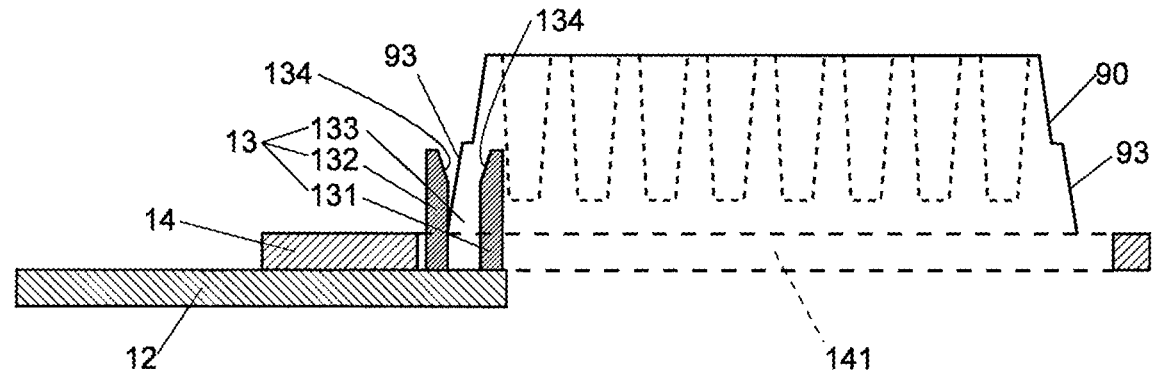
FIG. 4C is an enlarged view illustrating a state in which a flange of the sample accommodation unit is engaged with the engaging section.

The engaging section 13 is provided in the vicinity of the front tip of the upper surface of the movable table 12, and includes a first claw portion 131 and a second claw portion 132 extending upward from the upper surface of the movable table 12 (FIGS. 4A and 4B). The second claw portion 132 is disposed behind the first claw portion 131 with a gap 133 from the first claw portion 131. The gap 133 is set to be larger than the thickness of the flange 93 of a microplate 90. The engaging section 13 is engaged with the flange 93 by inserting the flange 93 into the gap 133 (FIG. 4C). Each of the first claw portion 131 and the second claw portion 132 is provided with a taper 134 in which a surface on the gap 133 side is formed in a shape away from the gap 133, from the vicinity of the center in the height direction toward the upper end. Note that the taper 134 may be provided on only one of the first claw portion 131 and the second claw portion 132.

The auxiliary mounting table 14 is formed of a rectangular plate member mounted on the auxiliary mounting table support rail 113, and a rectangular hole 141 is provided at the center of the plate-like member. The plate member and the rectangle of the hole 141 are provided such that one short side is on the front side.

The engaging section 13 is disposed inside the hole 141 of the auxiliary mounting table 14 when viewed from above, and the upper end of the engaging section 13 extends to the upper side of the upper surface of the auxiliary mounting table 14. The upper surface of the movable table 12 is below the upper surface of the auxiliary mounting table 14.

The movable table moving mechanism 15 includes a movable table linear moving mechanism 151 and a movable table tilting mechanism 152. The movable table linear moving mechanism 151 includes a motor and a mechanism configured to convert rotational motion of the motor into linear motion, and linearly move the movable table 12 in the front-rear direction by the linear motion. In the present embodiment, the auxiliary mounting table 14 is also configured to be linearly moved in the front-rear direction by the movable table linear moving mechanism 151. The movable table 12 is configured to be moved, by the movement in the front-rear direction, between a first position (FIGS. 3A, 5A, and 6A) separated from the internal mounting table 21 and a second position (FIGS. 3B, 5B, and 6B) close to the internal mounting table 21. When the movable table 12 is located at the first position, the engaging section 13 is disposed outside the sample storage 20, and when the movable table 12 is located at the second position, the engaging section 13 is disposed in the sample storage 20. Furthermore, the front end of the auxiliary mounting table 14 moves between the outside of the sample storage 20 and the inside of the sample storage 20.

Note that it is not essential in the present invention to move the auxiliary mounting table 14, and only the movable table 12 (and the engaging section 13 fixed to it) may be configured to be moved in the front-rear direction. In that case, it is preferable that the front end of the hole 141 of the auxiliary mounting table 14 is opened as in the present embodiment such that the engaging section 13 passes through the opening portion and reaches the inside of the sample storage 20. Furthermore, the auxiliary mounting table 14 may be omitted.

Figure 6A:
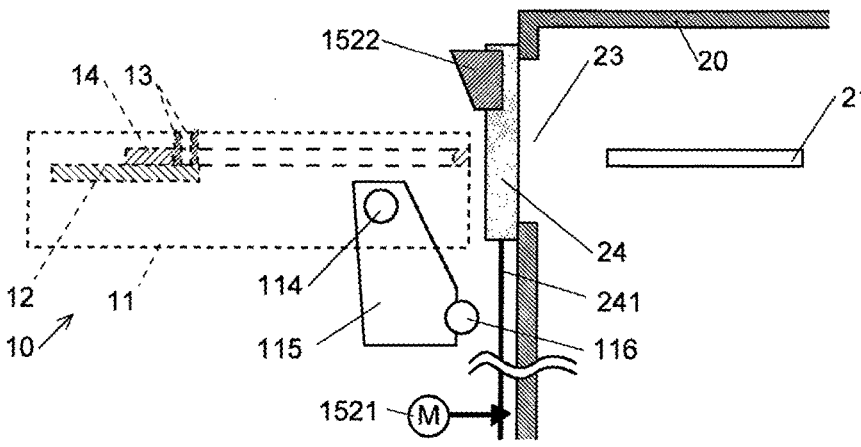
FIG. 6A is a cross-sectional view taken along line C-C illustrating a state in which the movable table is located at the first position in the sample inserting device of the present embodiment.
Figure 6B:
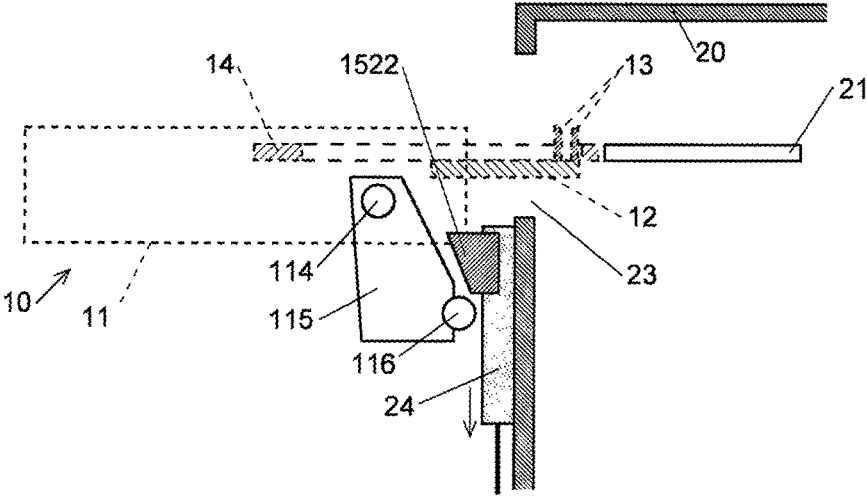
FIG. 6B is a cross-sectional view taken along line C-C illustrating a state in which the movable table is at the second position.
Figure 6C:
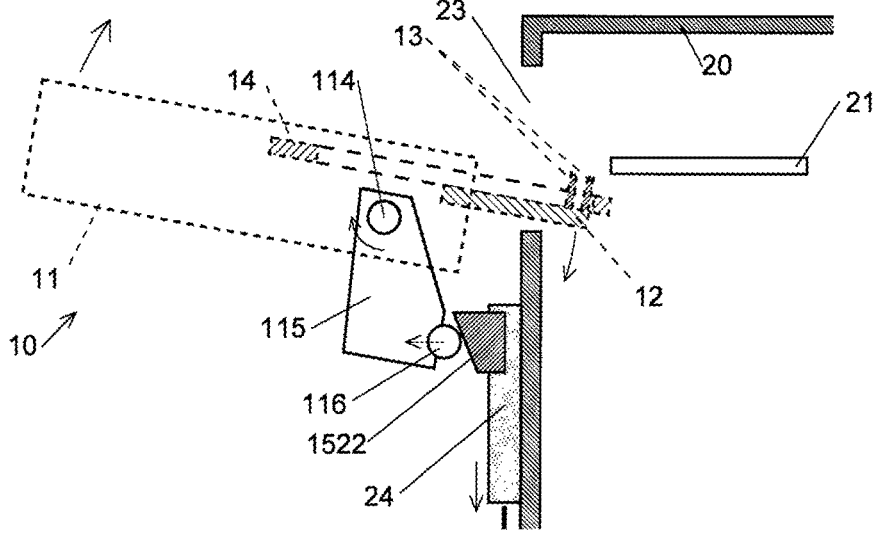
FIG. 6C is a cross-sectional view taken along line C-C illustrating a state in which the movable table is at the third position.

The movable table tilting mechanism 152 includes a movable table tilting/opening and closing door lifting motor 1521, a mechanism (not illustrated) configured to convert a rotational motion of the motor into a linear motion in the vertical direction, and an abutment tool 1522 configured to move in the vertical direction by the linear motion. Furthermore, on the side surface of the external mounting table 11, a substantially horizontal rotating shaft 114 extending in the left-right direction is provided at a position closer to the front than the center of gravity. A slab 115 extending downward and forward is further fixed to the side surface of the external mounting table 11, and a protrusion 116 is fixed to the front end of the slab 115 and forward and downward of the rotating shaft 114 (FIGS. 6A, 6B, and 6C).

When the abutment tool 1522 is above the protrusion 116, the external mounting table 11 is biased such that the rear side of the rotating shaft 114 is lowered by the weight of the external mounting table 11, and when the movable table 12 on the external mounting table 11 becomes substantially horizontal, a stopper (not illustrated) comes into contact with the lower side of the external mounting table 11, thus the movable table 12 is maintained in a substantially horizontal state. From this state, when the abutment tool 1522 descends and comes into contact with the protrusion 116, the protrusion 116 is pushed rearward (FIG. 6C). Since the protrusion 116 is fixed to the external mounting table 11 via the slab 115, the external mounting table 11 rotates about the rotating shaft 114 as the protrusion 116 is pushed rearward, and the front side of the rotating shaft 114 is tilted so as to be lowered. Accordingly, the movable table 12 and the auxiliary mounting table 14 are also tilted such that the front side is lowered. When the abutment tool 1522 is raised from this state and separated from the protrusion 116, the rear side of the rotating shaft 114 of the external mounting table 11 is lowered by its own weight and comes into contact with the stopper. As a result, the movable table 12 and the auxiliary mounting table 14 return to a substantially horizontal state.

In the present embodiment, the abutment tool 1522 is fixed to the side surface of the opening/closing door 24. With the rotation of the movable table tilting/opening and closing door lifting motor 1521, a connecting rod 241 extending below the opening/closing door 24 moves up and down, so that the opening/closing door 24 moves up and down and the abutment tool 1522 also moves up and down. The abutment tool 1522 is not in contact with the protrusion 116 (FIG. 6B) in a state where the opening/closing door 24 is lowered from the closed position where the sample loading/unloading port 23 is closed (FIG. 6A) to the open position where the entire sample loading/unloading port 23 is just opened. When the opening/closing door 24 further descends from the open position and the abutment tool 1522 comes into contact with the protrusion 116, the movable table 12 or the like are tilted as described above (FIG. 6C). The position of the movable table 12 when the movable table 12 is tilted in this manner from the state where the movable table is located at the second position corresponds to the above-described third position.

As described above, in the present embodiment, the opening/closing operation of the opening/closing door 24 and the tilting operation of the external mounting table 11, the movable table 12, and the like can be performed by the same motor (the movable table tilting/opening and closing door lifting motor 1521), so that the device cost can be suppressed.

Note that, in the above description, the protrusion 116 is pushed rearward by the abutment tool 1522, but the abutment tool 1522 may be configured to push the protrusion 116 downward. Furthermore, the abutment tool 1522 may be fixed to the connecting rod 241 instead of being fixed to the opening/closing door 24.

Hereinafter, with reference to FIGS. 3 to 7, an operation of inserting the sample accommodation unit 90 into the sample storage 20 by the sample inserting device 10 and an operation of taking out the sample accommodation unit 90 from the sample storage 20 will be described.

Figure 5A:
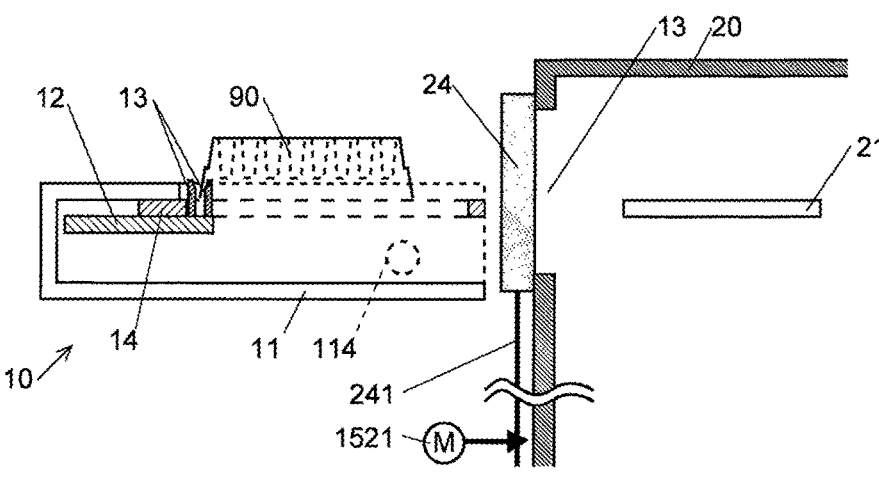
FIG. 5A is a cross-sectional view taken along line B-B illustrating a state in which the movable table is located at the first position in the sample inserting device of the present embodiment.

As described later, since the movable table 12 is located at the first position when the inserting and taking-out operations are completed, the movable table 12 is disposed at the first position when a new inserting operation is started. Furthermore, the sample loading/unloading port 23 is closed by the opening/closing door 24. In this state, the sample accommodation unit 90 is mounted on the movable table 12 and the auxiliary mounting table 14, and the flange 93 of the sample accommodation unit 90 is engaged with the engaging section 13 of the movable table 12 (FIGS. 3A, 5A, and 6A). Here, the auxiliary mounting table 14 supports a portion including a side portion (an end portion on a side with respect to a direction in which the movable table 12 moves between the first position and the second position as described later) of the sample accommodation unit 90.

Figure 3B:
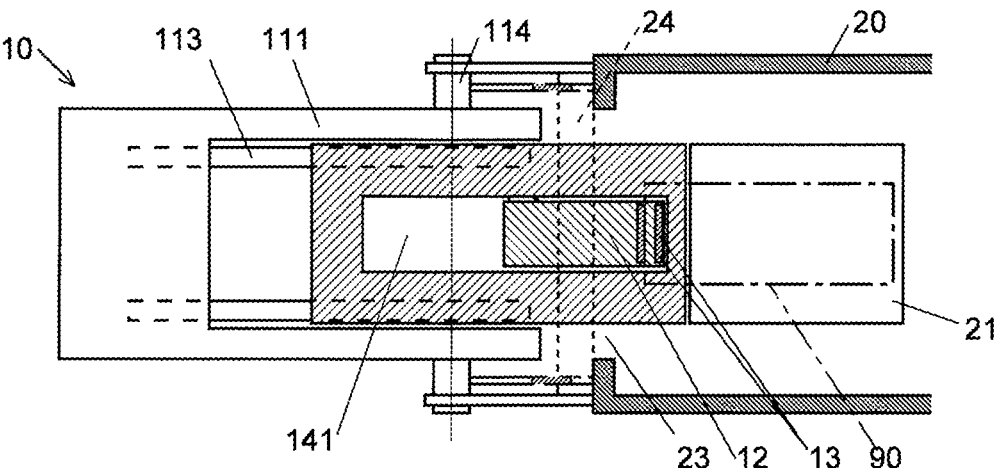
FIG. 3B is a top view illustrating a state in which the movable table is located at a second position and a third position in the sample inserting device of the present embodiment.
Figure 5B:
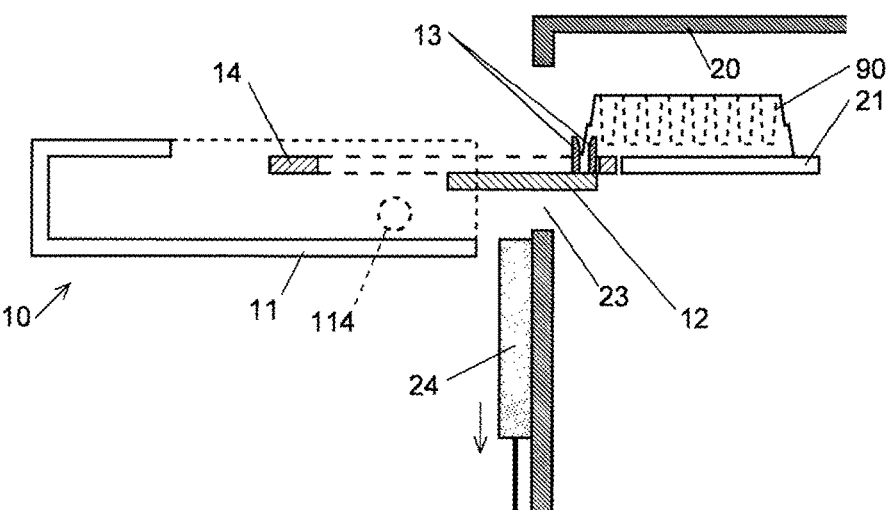
FIG. 5B is a cross-sectional view taken along line B-B illustrating a state in which the movable table is at the second position.

Next, the movable table tilting/opening and closing door lifting motor 1521 is operated to lower the opening/closing door 24 to a position where the abutment tool 1522 does not contact the protrusion 116 while the sample loading/unloading port 23 is opened. In a state in which the sample loading/unloading port 23 is opened in this manner, the movable table linear moving mechanism 151 moves the movable table 12 and the auxiliary mounting table 14 forward, that is, in a direction approaching the internal mounting table 21, and disposes the movable table 12 at the second position (FIGS. 3B, 5B, and 6B). As a result, the engaging section 13 is disposed immediately after the internal mounting table 21, and most of the sample accommodation unit 90 except for the first engaging section 931 is mounted on the internal mounting table 21. At this time, since the abutment tool 1522 does not abut on the protrusion 116 as described above, the movable table 12 is not tilted.

Figure 5C:
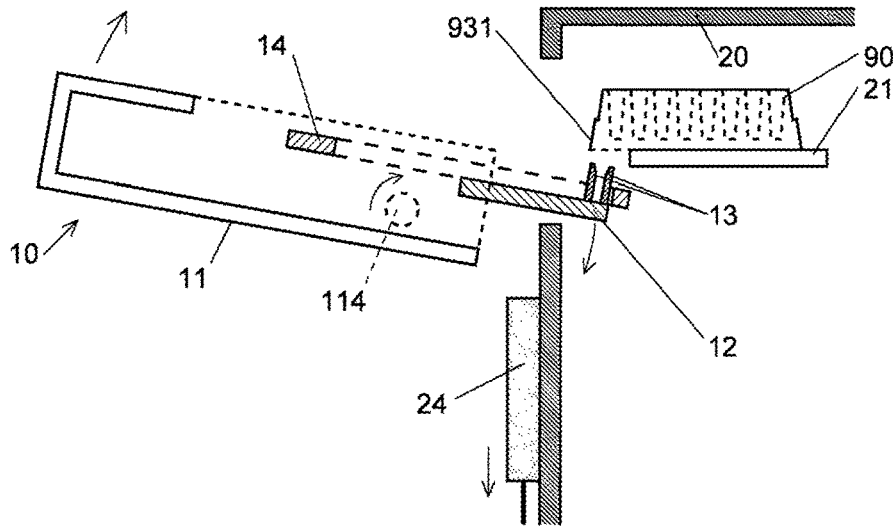
FIG. 5C is a cross-sectional view taken along line B-B illustrating a state in which the movable table is at the third position.

Subsequently, the movable table tilting mechanism 152 operates the movable table tilting/opening and closing door lifting motor 1521 to further lower the abutment tool 1522 (and the opening/closing door 24 to which the abutment tool is fixed), and the abutment tool 1522 is brought into contact with the protrusion 116 to tilt the external mounting table 11, the movable table 12, and the like (FIGS. 5C and 6C). As a result, the movable table 12 is disposed at the third position, and the flange 93 of the sample accommodation unit 90 and the engaging section 13 of the movable table 12 are disengaged and enter a disengaged state.

Next, the movable table 12 and the auxiliary mounting table 14 are moved in a direction away from the internal mounting table 21 by the movable table linear moving mechanism 151. Then, the movable table tilting mechanism 152 operates the movable table tilting/opening and closing door lifting motor 1521 to raise the opening/closing door 24 and the abutment tool 1522, thus releasing the tilting of the external mounting table 11, the movable table 12, and the like, and closing the sample loading/unloading port 23 by the opening/closing door 24. As a result, the movable table 12 returns to the first position.

Figure 7:
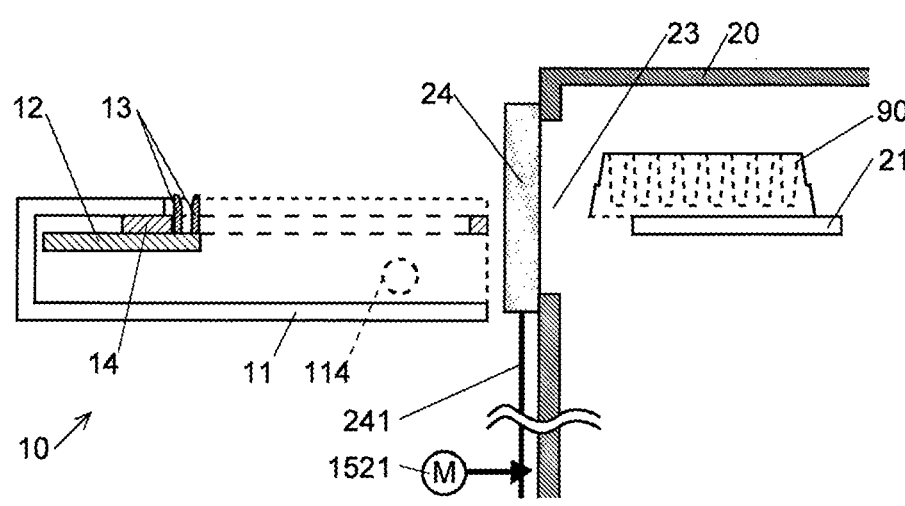
FIG. 7 is a cross-sectional view taken along line B-B illustrating a state in which inserting of the microplate into the sample storage is completed in the sample inserting device of the present embodiment.

By the above operation, the sample accommodation unit 90 is inserted into the sample storage 20, and the sample inserting device 10 returns to the initial state (FIG. 7).

When the sample accommodation unit 90 is taken out from the sample storage 20, the operation may be performed in the reverse order to the inserting.

Note that although the taking-out operation is started from a state in which the sample accommodation unit 90 transferred from the autosampler 30 or the sample storage shelf 22 is mounted on the internal mounting table 21, the sample accommodation unit 90 is not necessarily mounted at a certain position on the internal mounting table 21, and a slight positional deviation may occur. In such a case, by providing the taper 134 in the first claw portion 131 and the second claw portion 132 of the engaging section 13 (FIG. 4B), the flange 93 can be engaged with the engaging section 13 even if the position of the sample accommodation unit 90 is slightly shifted in the front-rear direction on the internal mounting table 21. The positional deviation in the left-right direction can be handled by providing the first claw portion 131 and the second claw portion 132 with a certain length in the left-right direction (FIG. 4A).

According to the sample inserting device 10 of the present embodiment, since the sample accommodation unit 90 in which a plurality of samples are accommodated in advance can be inserted into the sample storage 20 and taken out at once, it is possible to minimize the time during which the opening/closing door 24 of the sample loading/unloading port 23 of the sample storage 20 is open, which can minimize a change in temperature or condensation in the sample storage 20.

In the sample inserting device 10 actually manufactured by the present inventor, the time during which the opening/closing door 24 is open can be suppressed to about 10 to 20 seconds. Using the prepared sample inserting device 10, an experiment was conducted in which the microplate 90 was loaded in while the temperature was adjusted so that the inside of the sample storage 20 was cooled to a temperature in the range of 5 to 7° C. under an environment where the room temperature was 25° C. At that time, the opening time of the opening/closing door 24 was set to 10 seconds, and a temporal change in the temperature in the sample storage 20 and the temperature of the sample in the microplate stored in advance in the sample storage shelf 22 separately from the microplate 90 to be loaded in was measured. As a result, while the opening/closing door 24 was opened, the temperature in the sample storage 20 increased to 10.5° C., and the temperature of the sample on the sample storage shelf 22 increased to 8 to 9° C. However, these temperatures decreased immediately after the closing of the opening/closing door 24, and returned to the temperature (5 to 7° C.) before the opening/closing door 24 was opened in about 12 minutes. Furthermore, when air having a high temperature enters the sample storage 20 with the inner surface of the sample storage 20 cooled as the sample storage is cooled, the air may be cooled on the inner surface to generate dew condensation. However, when the inner surface was confirmed after the above experiment, such dew condensation did not occur.

Furthermore, if a robot, instead of the operator, performs the operation of mounting the sample accommodation unit 90 on the external mounting table 11 and the operation of picking up the sample accommodation unit from the external mounting table 11, the burden on the operator can be further reduced. At that time, the operation time can be further shortened by synchronizing the opening/closing operation of the opening/closing door 24 and the moving operation of the movable table 12 with the operation of the robot.

The present invention is not limited to the above embodiment, and various modifications can be made within the scope of the gist of the present invention.

For example, in the above embodiment, an example has been described in which the movable table is moved to the third position tilted with respect to the surface of the external mounting table, and the flange of the sample plate and the engaging section of the movable table are brought into a disengaged state. The present invention is not limited to the example, and a mechanism configured to change the engagement state between the flange of the sample plate and the engaging section of the movable table is provided. For example, when the engaging section protrudes from the movable table by an electrical or mechanical mechanism and is retracted and accommodated in the movable table, the engagement state can be changed without tilting the movable table.

Figure 8:
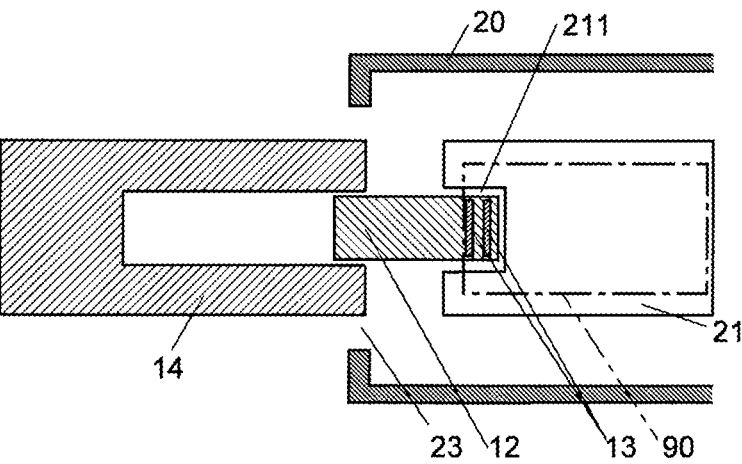
FIG. 8 is a top view illustrating an example in which a notch is provided at a tip of an internal mounting table on a sample loading/unloading port side in a sample inserting device of a modification.

In the above embodiment, a notch 211 may be provided at the end portion of the internal mounting table 21 on the sample loading/unloading port 23 side (FIG. 8). When the movable table 12 is moved to the second position, the tip of the movable table 12 reaches the inside of the notch 211, so that the sample accommodation unit 90 can reach a deeper position on the internal mounting table 21, and the portion of the sample accommodation unit 90 supported by the internal mounting table 21 becomes wider. Therefore, the sample accommodation unit 90 can be more stably mounted on the internal mounting table 21.

In the above embodiment, the temperature retaining device 25 configured to maintain the inside of the sample storage 20 at a temperature within the predetermined temperature range is provided, but the temperature retaining device 25 may be omitted when handling a sample that is not so sensitive to temperature. In such a case, a temperature change in the sample storage 20 due to the opening of the opening/closing door 24 does not cause a problem, but the sample inserting device of the embodiment allows the sample accommodation unit to be quickly inserted and taken out while suppressing the burden of the operation of the operator.

In the above embodiment, the case where the sample analysis device is a chromatograph has been described as an example, but the present invention can also be applied to a sample analysis device other than a chromatograph as long as the device sequentially analyzes a large number of liquid samples.

[Modes]

A person skilled in the art can understand that the previously described illustrative embodiments are specific examples of the following modes.

[Clause 1]

An analysis device according to Clause 1 includes:

a sample storage including an opening/closing part and an internal mounting table, the internal mounting table configured to receive a sample accommodation unit via the opening/closing part; and a sample inserting unit configured to insert the sample accommodation unit into the sample storage, wherein the sample accommodation unit, which has a plane direction, includes a flange provided at an end portion thereof in the plane direction, and the sample inserting unit includes:

an external mounting table provided outside the sample storage and having a surface;

a movable table provided on the surface of the external mounting table so as to be movable between a first position and a second position, the first position and second position being farther and closer with reference to the internal mounting table, the movable table including an engaging section configured to engage with the flange of the sample accommodation unit; and a driving unit configured to move the movable table to change an engagement state between the flange of the sample accommodation unit and the engaging section of the movable table.

According to the analysis device of Clause 1, the only things that should be performed are that an operator stores a sample in a sample accommodation unit in advance, and when the sample accommodation unit is inserted into a sample storage, the sample accommodation unit is mounted on a movable table at a first position and a flange of the sample accommodation unit is engaged with an engaging section of the movable table. Then, the sample inserting device automatically opens an opening/closing door unit, moves a movable table to a second position by a moving unit, closes the opening/closing part, and disengages the flange and the engaging section by a driving unit, thus the sample accommodation unit is inserted into the sample storage. Similarly, when the sample accommodation unit is taken out from the sample storage, the sample inserting device automatically sets the flange and the engaging section to be in an engaged state by the driving unit, opens the opening/closing part, and then moves the movable table from the second position to the first position by the moving unit to close the opening/closing part. The operator only needs to pick up, from the movable table, the sample accommodation unit mounted on the movable table moved to the first position and having the flange engaged with the engaging section. As described above, since the operation of inserting and taking out the sample into and from the sample storage can be easily performed collectively by the operation of inserting and taking out the sample accommodation unit, the time during which the opening/closing part of the sample storage is open can be minimized, and the temperature change or condensation in the sample storage can be minimized.

[Clause 2]

An analysis device according to Clause 2 is the analysis device according to Clause 1, in which the driving unit moves the movable table between the first position, the second position, and a third position where the movable table is tilted such that the flange and the engaging section are brought into a disengaged state from a state where the movable table is at the second position.

With the analysis device according to Clause 2, the flange and the engaging section can be easily brought into a disengaged state by tilting the movable table. Furthermore, by releasing the tilt of the movable table, the flange and the engaging section can be easily brought into an engaged state.

[Clause 3]

An analysis device according to Clause 3 is the analysis device according to Clause 2, in which the external mounting table includes a rotating shaft which is substantially vertical and substantially horizontal to a moving direction between the first position and the second position of the movable table, the sample storage includes a sample loading/unloading port which is an opening through which the sample accommodation unit passes, the opening/closing part includes an opening/closing door configured to move up and down between a closed position where the opening/closing part closes the sample loading/unloading port and an open position where the opening/closing part opens the sample loading/unloading port, the open position being lower than the closed position, and the driving unit includes a lifting driving unit configured to lower and raise a portion of the external mounting table closer to the second position than the rotating shaft, and lower and raise the opening/closing door.

In the analysis device according to Clause 3, the lifting driving unit tilts the external mounting table and the movable table on the external mounting table by lowering a portion closer to the second position than the rotating shaft of the external mounting table, and releases the tilting of the external mounting table and the movable table by raising a portion closer to the second position. Furthermore, the lifting driving unit opens the sample loading/unloading port by lowering the opening/closing door of the opening/closing part from the closed position to the open position, and closes the sample loading/unloading port by raising the opening/closing door from the open position to the closed position. As described above, according to the analysis device according to Clause 3, since the tilt and release of the tilt of the movable table and the opening and closing of the opening/closing part can be performed by the same lifting driving unit, the device cost can be suppressed.

[Clause 4]

An analysis device according to Clause 4 is the analysis device according to any one of Clauses 1 to 3, further including an auxiliary mounting table on the external mounting table, the auxiliary mounting table supporting an end portion of the sample accommodation unit on a side in a direction in which the movable table moves between the first position and the second position.

[Clause 5]

An analysis device according to Clause 5 is the analysis device according to Clause 4, in which the auxiliary mounting table is movable in the same direction as the movable table moves between the first position and the second position.

According to the analysis device according to Clause 4, when the movable table is moved from the first position to the second position (or vice versa), the external mounting table is also moved so as to approach the internal mounting table (or vice versa), thus the sample accommodation unit can be moved in a state of being stably supported on the external mounting table. Furthermore, according to the analysis device according to Clause 5, since the auxiliary mounting table also moves with the movement of the movable table, the sample accommodation unit can be moved in a state of being more stably supported.

[Clause 6]

An analysis device according to Clause 6 is the analysis device according to any one of Clauses 1 to 5, in which the engaging section includes two claw portions disposed side by side with a gap interposed between them in a moving direction of the movable table between the first position and the second position, and one or both of the two claw portions have a taper formed in a shape in which a surface on the gap side moves away from the gap toward an upper end.

According to the analysis device according to Clause 6, even if the sample accommodation unit is disposed on the internal mounting table slightly shifted from the predetermined position with respect to the moving direction of the movable table, the flange of the sample accommodation unit is introduced into the gap between the two claw portions along the taper, so that the flange and the engaging section can be engaged.

[Clause 7]

An analysis device according to Clause 7 is the analysis device according to any one of Clauses 1 to 6, further including:

a sample collection unit configured to collect a sample stored in the sample accommodation unit inserted into the sample storage; and an analysis unit configured to analyze the sample collected by the sample collection unit.

[Clause 8]

An analysis device according to Clause 8 is the analysis device according to Clause 7, in which the analysis unit is a chromatograph.

With the sample analysis devices according to Clauses 7 and 8, since the sample inserting unit is provided, it is possible to suppress volatilization of the solvent, decomposition of the solute, precipitation of the solute, and the like in the sample collected by the sample collection unit, and more accurate analysis can be performed in the analysis unit (chromatograph in the analysis device according to Clause 8).

REFERENCE SIGNS LIST

1 . . . Chromatograph (Analysis Device)
10 . . . Sample Inserting Device (Sample Inserting Unit)
11 . . . External Mounting Table
111 . . . Main Body of External Mounting Table
112 . . . Movable Table Guide Rail
113 . . . Auxiliary Mounting Table Support Rail 114 . . . Rotating Shaft
115 . . . Slab
116 . . . Protrusion
12 . . . Movable Table
121 . . . Grip Part
13 . . . Second Engaging Section
131 . . . First Claw Portion
132 . . . Second Claw Portion
133 . . . Gap
134 . . . Taper
14 . . . Auxiliary Mounting Table
141 . . . Hole Provided in Auxiliary Mounting Table
15 . . . Movable Table Moving Mechanism (Driving Unit)
151 . . . Movable Table Linear Moving Mechanism
152 . . . Movable Table Tilting Mechanism
1521 . . . Movable Table Tilting/Opening and Closing Door Lifting Motor
1522 . . . Abutment Tool
20 . . . Sample Storage
21 . . . Internal Mounting Table
22 . . . Sample Storage Shelf
23 . . . Sample Loading/Unloading Port
24 . . . Opening/Closing Door (Opening/Closing Part)
241 . . . Connecting Rod
25 . . . Temperature Retaining Device
30 . . . Autosampler
31 . . . Sample Plate
32 . . . Plate Driving Unit
33 . . . Needle
34 . . . Sample Collection Unit
40 . . . LC Unit
41 . . . Mobile Phase Container
42 . . . Pump
43 . . . Injector
44 . . . Column
45 . . . Detector
90 . . . Sample Accommodation Unit (Microplate)
91 . . . Main Body Portion of Sample Accommodation Unit
911 . . . Well
93 . . . Flange

The invention claimed is:

1. An analysis device comprising:

a sample storage including an opening/closing part and an internal mounting table, the internal mounting table configured to receive a sample accommodation unit via the opening/closing part, and a sample inserting unit configured to insert the sample accommodation unit into the sample storage, wherein the sample accommodation unit, which has a plane direction, includes a flange provided at an end portion thereof in the plane direction, and the sample inserting unit includes:

an external mounting table provided outside the sample storage and having a surface;

a movable table provided on the surface of the external mounting table so as to be movable between a first position and a second position, the first position and second position being farther and closer with reference to the internal mounting table, the movable table including an engaging section configured to engage with the flange of the sample accommodation unit; and a driving unit configured to move the movable table to change an engagement state between the flange of the sample accommodation unit and the engaging section of the movable table.

2. The analysis device according to claim 1, wherein the driving unit moves the movable table between the first position, the second position, and a third position where the movable table is tilted such that the flange and the engaging section are brought into a disengaged state from a state where the movable table is at the second position.

3. The analysis device according to claim 2, wherein
the external mounting table includes a rotating shaft which is substantially vertical and substantially horizontal to a moving direction between the first position and the second position of the movable table,
the sample storage includes a sample loading/unloading port which is an opening through which the sample accommodation unit passes,
the opening/closing part includes an opening/closing door configured to move up and down between a closed position where the opening/closing part closes the sample loading/unloading port and an open position where the opening/closing part opens the sample loading/unloading port, the open position being lower than the closed position, and
the driving unit includes a lifting driving unit configured to lower and raise a portion of the external mounting table closer to the second position than the rotating shaft, and lower and raise the opening/closing door.

4. The analysis device according to claim 1, further comprising an auxiliary mounting table on the external mounting table, the auxiliary mounting table supporting an end portion of the sample accommodation unit on a side in a direction in which the movable table moves between the first position and the second position.

5. The analysis device according to claim 4, wherein the auxiliary mounting table is movable in the same direction as the movable table moves between the first position and the second position.

6. The analysis device according to claim 1, wherein the engaging section includes two claw portions disposed side by side with a gap interposed between them in a moving direction of the movable table between the first position and the second position, and one or both of the two claw portions have a taper formed in a shape in which a surface on the gap side moves away from the gap toward an upper end.

7. The analysis device according to claim 1, further comprising:
a sample collection unit configured to collect a sample stored in the sample accommodation unit inserted into the sample storage; and
an analysis unit configured to analyze the sample collected by the sample collection unit.

8. The analysis device according to claim 7, wherein the analysis unit is a chromatograph.

* * * * *